(12) United States Patent
Albert

(10) Patent No.: US 6,861,947 B2
(45) Date of Patent: Mar. 1, 2005

(54) METHOD FOR MANAGING THE OPERATING CONDITION OF AN ANTI-THEFT SECURITY DEVICE FOR A MOTOR VEHICLE AND DEVICE THEREFOR

(75) Inventor: Pascal Albert, Bertrange (LU)

(73) Assignee: Sevic System AG, Neuwied (DE)

( * ) Notice: Subject to any disclaimer, the term of this patent is extended or adjusted under 35 U.S.C. 154(b) by 0 days.

(21) Appl. No.: 10/257,134
(22) PCT Filed: Apr. 9, 2001
(86) PCT No.: PCT/FR01/01079
§ 371 (c)(1), (2), (4) Date: Oct. 9, 2002
(87) PCT Pub. No.: WO01/76919
PCT Pub. Date: Oct. 18, 2001

(65) Prior Publication Data
US 2003/0047371 A1 Mar. 13, 2003

(30) Foreign Application Priority Data
Apr. 10, 2000 (FR) .......................................... 00 04788

(51) Int. Cl.[7] .............................................. B60R 25/10
(52) U.S. Cl. .......................... 340/426.11; 340/426.12; 340/426.13; 340/426.17; 340/825.69; 340/825.72; 123/179.2; 307/10.3; 307/10.6
(58) Field of Search ..................... 340/426.17, 426.11, 340/426.12, 426.13, 426.16, 426.35, 426.36, 539.21, 539.23, 825.69, 825.72; 180/287, 272; 107/10.2, 10.4; 123/179.2; 307/10.1, 10.3, 10.6, 9.1

(56) References Cited

U.S. PATENT DOCUMENTS

| 4,987,406 | A | | 1/1991 | Reid |
|---|---|---|---|---|
| 5,349,329 | A | * | 9/1994 | Smith ..................... 340/539.23 |
| 5,396,215 | A | * | 3/1995 | Hinkle .................. 340/426.11 |
| 5,723,911 | A | * | 3/1998 | Glehr ......................... 307/10.2 |
| 5,793,306 | A | * | 8/1998 | Vershinin et al. ....... 340/825.69 |
| 6,049,268 | A | * | 4/2000 | Flick ....................... 340/425.5 |

FOREIGN PATENT DOCUMENTS

EP          0 319 428          6/1989

* cited by examiner

Primary Examiner—Davetta W. Goins
(74) Attorney, Agent, or Firm—Young & Thompson

(57) ABSTRACT

Anti-theft security devices for a motor vehicle, comprise portable transmitting elements, of a receiving module on board the vehicle and of elements controlling a system for interrupting at least one circuit required for operating the vehicle (ignition circuit engine, fuel intake circuit or other . . . ) when the distance between the transmitting elements and the receiving elements exceeds a certain value. The method for managing the operation of such a device consists, when resetting the affected circuit(s), following an interruption relative to accidental signal loss, in performing this resetting only very gradually.

11 Claims, 3 Drawing Sheets

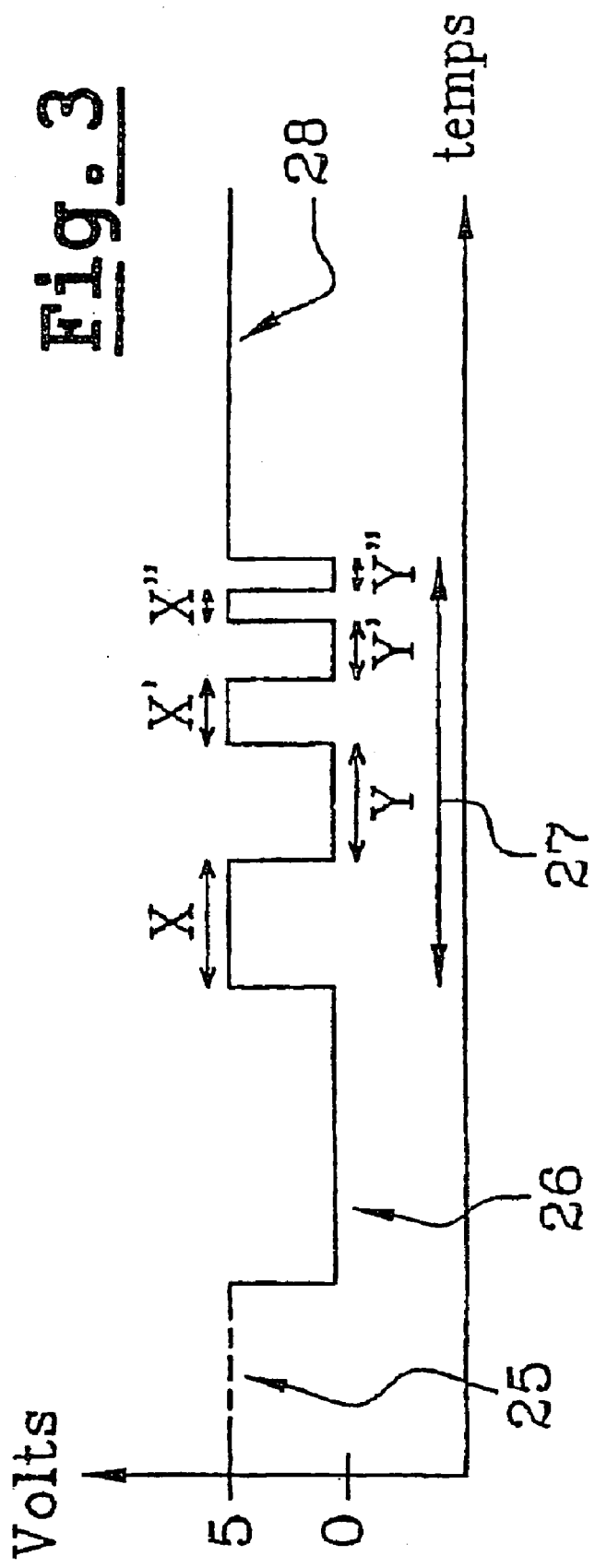

METHOD FOR MANAGING THE OPERATING CONDITION OF AN ANTI-THEFT SECURITY DEVICE FOR A MOTOR VEHICLE AND DEVICE THEREFOR

BACKGROUND OF THE INVENTION

This invention concerns a method for managing the operating conditions of an anti-theft security device for a motor vehicle (automotive vehicle, motorcycle or lorry), such device being of the type comprising—portable transmitting means,—receiving means on board the vehicle and—means controlling at least one system for interrupting at least one circuit required for operating said vehicle (engine ignition circuit, fuel intake circuit or other . . . ) when the distance between the transmitting means and the receiving means exceeds a certain value. This invention also concerns the anti-theft security device enabling the implementation of the method.

It is known by the document EP-0 319 428 a security device for automotive vehicle, comprising a portable transmitter which transmits a high frequency signal (HF), and a fixed receiver adapted for interrupting automatically the engine ignition circuit of the vehicle when the distance between said portable transmitter and said on-board receiver exceeds a certain value. Such a system enables to stop the motorisation of the vehicle, particularly in case of theft, as soon as said vehicle moves away from the carrier of the transmitter.

The transmitter sends a low power, encoded cyclic signal HF. When this signal is acknowledged and validated by the receiving means, a relay or equivalent closes the engine ignition circuit for its operation. When the receiving system no longer receives the transmitted signal HF, the relay interrupts the ignition circuit to stop the motorisation.

Time delay means have been provided to maintain the control of the relay for a duration greater than the duration between two encoded sequences, in order to avoid any abusive interruption in case of transients, or more generally in case of accidental signal loss.

However, if the duration of accidental loss of this signal is greater than the time delay duration, the ignition circuit is automatically interrupted by means of the relay and the motorisation of the vehicle does not operate any longer. In case when it happens whereas the vehicle is in use, the driver may have a tendency to control the lever or the accelerator, and when the signal is reset, sudden return to service of the motorisation may cause said vehicle to become incontrollable.

The purpose of this invention is to remedy this shortcoming.

SUMMARY OF THE INVENTION

Thus, according to this invention, one manages the operation of the anti-theft security device in order to perform gradual resetting of the ignition circuit and/or of another circuit required for operating the vehicle, following an interruption of this circuit relative to accidental signal loss.

Resetting the corresponding circuit(s) is preferably performed after a succession of activations and deactivations of the interruption system placed on said circuit(s).

This succession of activations and of deactivations is carried out preferably with decreasing durations of deactivation and also with decreasing durations of activation.

One thus secures the usage of the anti-theft device since the simply gradual resetting of the circuit(s) required for the operation of the vehicle, following an interruption relative to accidental signal loss, avoid any risk of losing control of the vehicle.

The anti-theft security device which enables the implementation of this method comprises portable transmitting means, a receiving module on board the vehicle and means controlling an interruption system of at least one circuit required for operating the vehicle (engine ignition circuit, fuel intake circuit . . . ), for interrupting this or these circuits when the distance between said transmitter and said receiver exceeds a certain value. According to the invention, this device also comprises means which, when resetting the corresponding circuit(s), following an interruption relative to accidental signal loss, perform the resetting of this or of these circuits only very gradually.

According to a preferred embodiment, the interruption system is in the form of a power output interposed on the engine ignition circuit for interrupting or resetting this circuit in relation to the signal or the absence of signal supplied by controlling means in the form of microprocessor this microprocessor manages the sending of the corresponding signal in relation to the pieces of information from the receiving system.

The interruption system may also have the form of an electrovalve placed on the fuel intake circuit.

According to another characteristic, a power output controlled by the microprocessor enables to activate the blinking warning lights of the vehicle, as well as a sound device such as a "buzzer".

Still according to the invention, suitable means enable to sense the presence of a starter contact, and the corresponding piece of information is transmitted to the microprocessor so that the latter may differentiate the operating procedure of the security device in case of signal loss, according to the presence or the absence of this starter contact.

BRIEF DESCRIPTION OF THE DRAWINGS

But the invention will also be illustrated, without being limited thereto, by the following description of a particular embodiment, given solely for exemplification purposes and represented on the appended drawings wherein:

FIG. 3 is a graph which illustrates the type of signal sent by the microprocessor to the power output placed on the ignition circuit of the motorisation of the vehicle, for performing only very gradual resetting of the ignition.

DESCRIPTION OF THE PREFERRED EMBODIMENTS

Figure 1:
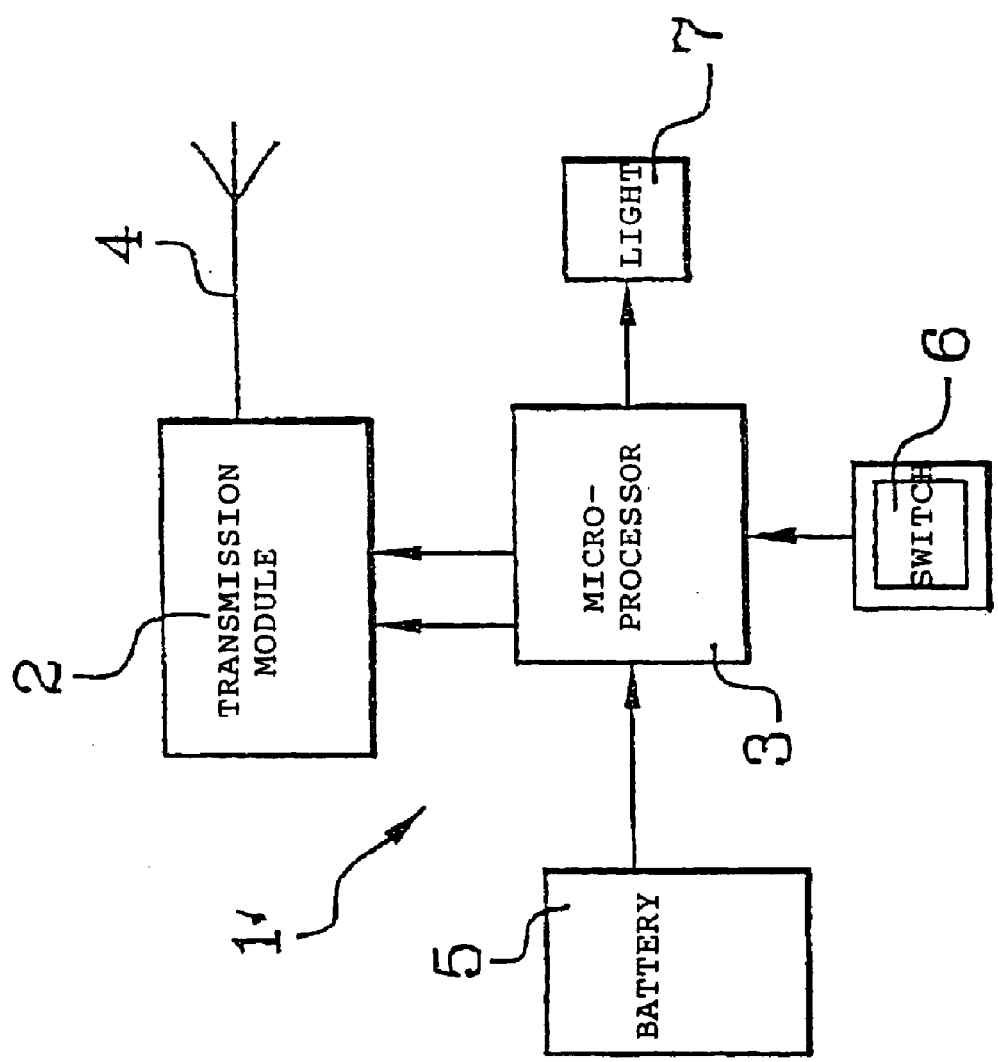
FIG. 1 is a principle diagram of the portable transmitting means of the anti-theft security device according to this invention.

The transmitting means 1 represented on FIG. 1 comprise a transmission module 2, for example high frequency (HF), whereof the operation is managed by a microprocessor 3 to send to an antenna 4 a cyclic and low power encoded signal.

The transmission module 2 may be a model LQ-TX 433A-S manufactured by LPRS—Oxon—Great-Britain. The microprocessor 3 with built-in clock, may be a model 2343 with EDPROM, manufactured by ATMEL (Paris, France).

The different components of the transmitting means 1 are implanted on a printed circuit and connected together logically. A battery 5 provides their electric supply and the assembly is placed in a portable case which may be fitted with a system that can be suspended from a pocket or a belt.

Switching on or off the transmitting means 1 is controlled by an on/off switch 6 arranged on the portable case. This case also comprises a light indicator 7 of the LED type whereof the activation is managed by the microprocessor 3.

The signal sent by the transmitting means 1 carries an encoding generated by the microprocessor 3 to secure the operation of the device. On the other hand, this signal is sent cyclically to save the battery 5; for example the transmission is carried out on the frequency of 433 MHz, and so for one second every 2.5 or 3 seconds (the transmission duration and the period are managed by the microprocessor 3).

One also intends to limit the power of the signal transmitted (a few milliwatts) in order to enable a reception only within a few metre radius.

Figure 2:
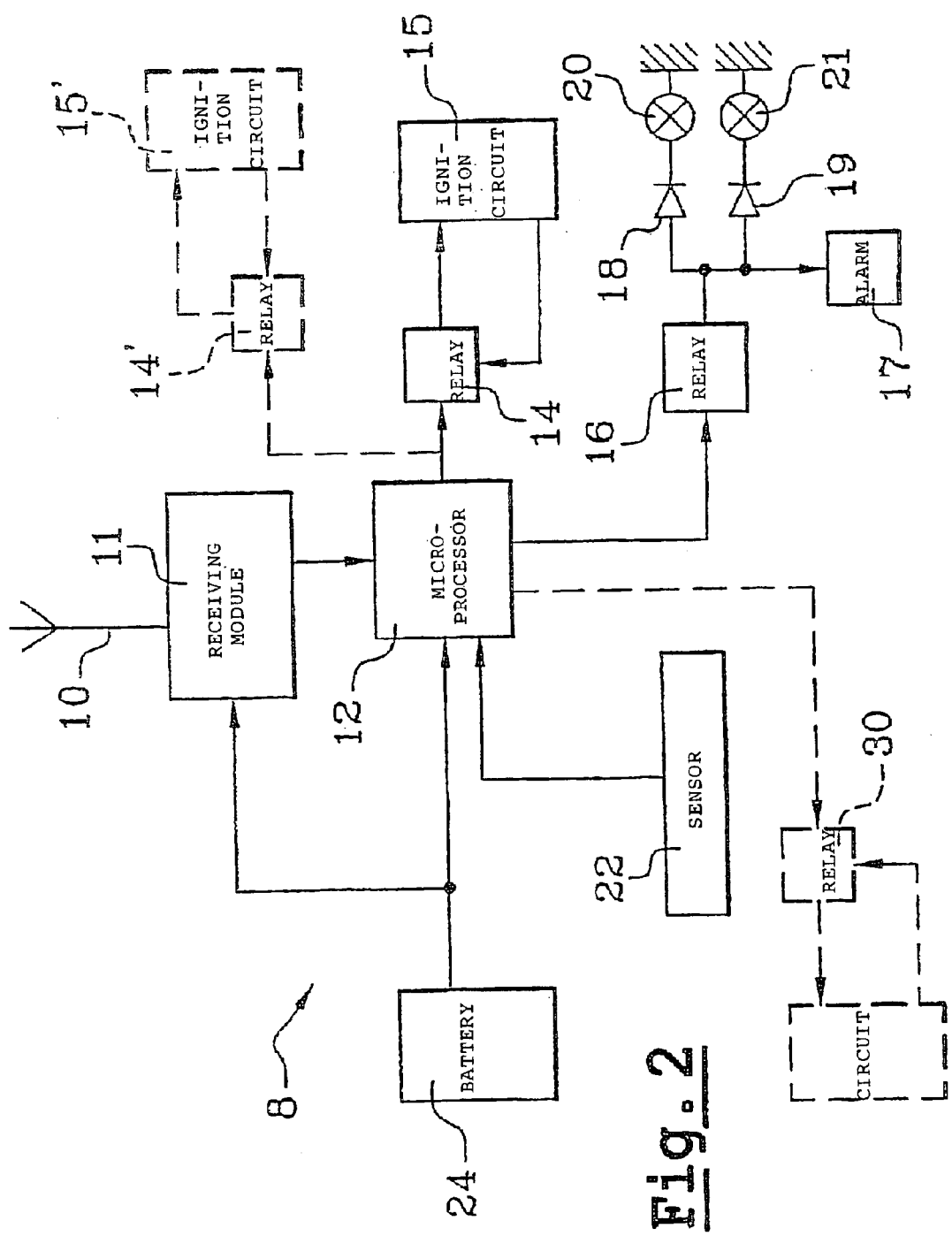
FIG. 2 is a principle diagram of the receiving means on board the vehicle.

The receiving means 8 represented on FIG. 2 are on board the vehicle assembly. They consist of an antenna 10 connected to a receiving module 11 associated with a microprocessor 12. This microprocessor 12 is intended to check, by identification of the encoding, that the signal received is indeed that from the transmitting means 1 and, in relation to the information received, to manage the activation:

of a power output 14 (relay or equivalent) placed on the ignition circuit 15 of the motorisation of the vehicle, and of a power output 16 (relay or equivalent) which controls, simultaneously, a sound alarm 17 in the form of a "buzzer" and a redundant output with non-return diodes 18, 19 to supply the right hand side 20 and left hand side 21 blinking beams of the vehicle.

The microprocessor 12 also takes into account the presence or the absence of a starter contact of the vehicle to manage the operation of the security device. The corresponding information is sent to said device by appropriate sensing means 22 (for example from sensing a voltage on the on/off contactor of the starter).

The receiving module 11 may be a model RX 5000 manufactured by RFM (USA) and distributed by EQUIPEMENT SCIENTIFIQUE—GARCHE—France. The microprocessor 12 is for example a model 2343 with EDPROM manufactured by Société ATMEL (Paris, France).

The different electronic components of the receiving means 8 are implanted on a printed circuit and connected together logically. The receiving module 11 and the microprocessor 12 are power supplied by the battery 24 of the vehicle.

Once the receiving means 8 have been implanted correctly on the vehicle assembly (for example a motorcycle), the anti-theft security device operates as described hereunder.

The transmitting means 1 being deactivated (switch 6 in 'off' position) the receiving module 11 does not receive the corresponding signal HF and the microprocessor 12 controls the power output 14 in order to open the ignition circuit 15 of the vehicle, prohibiting the operation of the motorisation.

Putting into service the anti-theft security device is performed by depressing the switch 6 ('on' position), the light indicator 7 can then signal this activation, for example by remaining lit steadily, of so-called "long" duration, one to two seconds.

When the user moves closer to his vehicle, the receiving module 11 detects the signal HF transmitted by the transmitting means 1 and it sends the information to the microprocessor 12. After identification of the signal, the microprocessor 12 closes the ignition circuit 15 while actuating the power output 14, and triggers the transmission of an identification message while actuating the blinking warning lights 20, 21 and the "buzzer" 17 by means of the power output 16 (for example transmission of three 'brief' blinking signals accompanied by three sound beeps).

One can then start the vehicle and use it at will in a conventional fashion.

When the user stops, kills the engine and moves away from the vehicle, as soon as the receiving module 11 does not receive the signal HF transmitted by the transmitting means 1 any longer, the microprocessor 12 actuates the power output 14 for interrupting the ignition circuit 15. This activation of the anti-starting system is signalled by the blinking warning lights 20, 21 and the "buzzer" 17 (for example transmission of one 'brief' blinking signal accompanied by one sound beep).

The corresponding activation of the power outputs 14 and 16 may be performed a certain time delay after the effective loss of the signal HF by the receiving module 11, for example ten seconds later.

The vehicle then cannot start before the person carrying the transmitting means 1 returns to the sensing zone of the receiving module 11.

In case of aggression or of theft, with the engine running, when the vehicle moves away from the user and the receiving module 11 does not receive the signal HF transmitted by the transmitting means 1 any longer, the microprocessor 12 actuates the power output 14 for interrupting the ignition circuit 15. This operation then is not accompanied by any light or sound signal; it may be performed only a certain time delay after losing the reception of the signal HF, for example ten seconds later.

The aggressor/thief then cannot start the vehicle any longer and he has no other solution than leave and run away.

When the user walks towards his vehicle again, the security device identifies him, deactivates the anti-starting system and transmits the light and sound recognition signals (for example in the form of three blinking signals accompanied by three sound beeps).

When he need not use the vehicle any longer, the user deactivates the transmitting means HF by depressing the switch 6 (in "off" position) and the anti-starting system is automatically put into service. The deactivation of the transmitting means 1 can be accompanied by a control signal of the light indicator 7 (for example a 'short' steady light of the order of a few tenths of a second).

The use of transmitting/receiving means involves the risk of abusive activation of the anti-starting system in case of accidental loss of the signal (presence of transients or others . . . ). Then, the temporary interruption or the successive interruptions of the ignition circuit disturb the correct operation of the vehicle in motion.

To limit this risk, the microprocessor 12 integrates a time delay which, following a validation of the signal received by the receiving module 11, enables to maintain the power output 14 in the closed position of the ignition circuit 15 for a duration encompassing at least a full period of the cyclic signal HF.

In case when the accidental loss of the signal exceeds the duration of this time delay, the ignition circuit is automatically interrupted; the security device integrates means which then enable, when the receiving module 11 receives suitably again the signal transmitted, to reset the ignition circuit 15 only very gradually.

Gradually resuming of the ignition is managed by the microprocessor 12 whereof the signal then sent to the power output 14 is of discontinuous type, before finding a continuous character corresponding to a standardised operation of the security device and of the motorisation of the vehicle. This particular control management of the power output 14 enables to avoid all the risks of losing control of the vehicle which would be associated with sudden resetting of the ignition circuit.

The management of the signal sent in this particular case by the microprocessor 12 to the power output 14 is illustrated on FIG. 3.

On this figure, it can be noticed a first period 25 of "normal" operation during which the microprocessor 12 controls the power output 14 to close the ignition circuit 15 by sending a 5-volt electric signal, followed with a period 26 during which the microprocessor 12 does not send the electric signal corresponding to the power output 14 any longer, because for example of a reception problem of the signal HF sent by the transmitting means 1.

When the reception of the signal HF is restored, the microprocessor 12 sends a discontinuous signal to the power output 14 for a certain time period 27, before going back to addressing a continuous signal (repeated period 28).

The discontinuous signal during the period 27 corresponds to a succession of activations and of deactivations of the power output 14. For regular gradual resetting of the ignition of the engine, the durations of successive activations X, X', X" are decreasing, just like the durations of intermediate deactivations Y, Y', Y" (For example X=0.5 s, Y=0.4 s, X'=0.3 s, Y'=0.2 s, X"=0.1 s, Y"=0.1 s).

The microprocessor 12 can similarly manage the interruption of the fuel intake circuit, or the interruption of any other circuit required for operating the vehicle, on the basis of the information supplied by the transmitting/receiving means. This management on another circuit than the ignition circuit 15 may be performed in addition to or in replacement of actuating said ignition circuit 15.

On FIG. 2, one has illustrated a principle of simultaneous management of the interruption of the ignition circuit 15 and of the fuel intake circuit 15' (represented as a dotted line); the interruption system 14' of the fuel intake circuit 15' can be in the form of an electrovalve-like module, placed on the corresponding circuit.

It should also be noted that the microprocessor 12 can also manage one or several additional power outputs 30, intended for example for actuating or deactivating the starting function of the vehicle, or even for an automotive vehicle, intended for controlling the interlocking of the doors, the rolling up of the windows, or other . . .

What is claimed is:

1. A method for managing the operation of an anti-theft security device for a motor vehicle, which device consists of portable transmitting means (1), of a receiving module (11) on board said vehicle and of means controlling (12) a system (14, 14') for interrupting at least one circuit (15, 15') required for operating the vehicle, when the distance between said transmitting means (1) and said receiving module (11) exceeds a certain value, said circuit (15, 15') will be reset following an interruption upon accidental signal loss, wherein said circuit (15, 15') will reset itself very gradually once the signal between said on board vehicle and said portable transmitting means is regained after said signal loss.

2. The method according to claim 1, wherein the resetting of the circuit (15, 15') required for operating the vehicle is performed after a succession of activations and of deactivations of the interruption system (14, 14').

3. The method according to claim 2, wherein the resetting of the circuit (15, 15') after a succession of activations and of deactivations of the interruption system (14, 14'), is performed with decreasing durations of deactivations.

4. The method according to claim 3, wherein the resetting of the circuit (15, 15') after a succession of activations and of deactivations of the interruption system (14, 14'), is performed with decreasing durations of activations.

5. An anti-theft security device for the implementation of the method according to claim 1, which device consists of portable transmitting means (1), of a receiving module (11) on board said vehicle and of means controlling (12) an interruption system (14, 14') of at least one circuit (15, 15') required for operating the vehicle, for interrupting said circuit (15, 15') when the distance between said transmitter (1) and said receiver (11) exceeds a certain value, wherein the device further comprises means which, when resetting said circuit(s) (15, 15') following an interruption relative to accidental signal loss, perform the gradual resetting of this or of these circuits (15, 15').

6. The security device according to claim 5, further comprising an interruption device (14) in the form of a power output interposed on said ignition circuit (15) of the engine for interrupting or resetting this circuit in relation to the signal or of the absence of a signal supplied by controlling means in the form of a microprocessor (12), which microprocessor (12) manages the sending of this signal in relation to the information received from the receiving module (11).

7. The security device according to claim 5, further comprising an interruption device (14') in the form of an electrovalve placed on the fuel intake circuit (15') for interrupting or resetting this circuit in relation to the signal or of the absence of a signal supplied by controlling means in the form of a microprocessor (12), which microprocessor (12) manages the sending of this signal in relation to the information received from the receiving module (11).

8. The security device according to claim 6, further comprising a power output (16) controlled by the microprocessor (12), enabling activation of the blinking warning lights (20, 21) of the vehicle, and activation of a sound device (17) such as a "buzzer".

9. A security device according to claim 6, further comprising means (22) which enable to sense the presence of a starter contact, the corresponding information being transmitted to the microprocessor (12) to differentiate the operating procedure in case of signal loss, in relation to the presence or the absence of said starter contact.

10. The security device according to claim 6, further comprising at least one additional power output (30) controlled by the microprocessor (12) to activate or deactivate complementary security functions.

11. A security device according to claim 6, further comprising transmitting means (1) in the form of a portable case integrating a module (2) for transmitting a low power encoded cyclic signal, means in the form of a microprocessor (3) performing the management of the signal transmitted by the transmitting module (2), notably in terms of encoding and in terms of cyclic sending, a supply battery (5), an on/off switch (6) and a control light indicator (7).

* * * * *